United States Patent
Hung (10) Patent No.: US 8,366,060 B2
(45) Date of Patent: Feb. 5, 2013

(54) SUPPORTING ARM ASSEMBLY FOR A DISPLAY

(75) Inventor: Chin-Jui Hung, Wu-Chi Chen (TW)

(73) Assignee: Modernsolid Industrial Co., Ltd., Taichung Hsien (TW)

( * ) Notice: Subject to any disclaimer, the term of this patent is extended or adjusted under 35 U.S.C. 154(b) by 239 days.

(21) Appl. No.: 12/822,320

(22) Filed: Jun. 24, 2010

(65) Prior Publication Data

US 2011/0315843 A1 Dec. 29, 2011

(51) Int. Cl.
*A47F 5/00* (2006.01)

(52) U.S. Cl. .................. 248/124.1; 248/278.1; 248/921; 361/679.06

(58) Field of Classification Search ............... 248/122.1, 248/124.1, 274.1, 276.1, 278.1, 282.1, 917, 248/919, 921; 361/679.06, 679.21
See application file for complete search history.

(56) References Cited

U.S. PATENT DOCUMENTS

| | | | | |
|---|---|---|---|---|
| 5,975,472 A * | 11/1999 | Hung | ......................... | 248/278.1 |
| 6,394,403 B1 * | 5/2002 | Hung | ......................... | 248/276.1 |
| 7,207,537 B2 * | 4/2007 | Hung | ......................... | 248/284.1 |
| 7,264,212 B2 * | 9/2007 | Hung | ......................... | 248/282.1 |
| 7,338,022 B2 * | 3/2008 | Hung | ......................... | 248/278.1 |
| 7,472,458 B2 * | 1/2009 | Oddsen, Jr. | ..................... | 16/255 |
| 7,540,457 B2 * | 6/2009 | Oddsen et al. | ............. | 248/278.1 |
| 7,694,927 B2 * | 4/2010 | Chuang | ........................ | 248/276.1 |
| 8,020,821 B2 * | 9/2011 | Chen et al. | ............... | 248/220.22 |
| 8,070,114 B2 * | 12/2011 | Chen | ............................. | 248/121 |
| 2004/0262474 A1 * | 12/2004 | Boks et al. | ................. | 248/276.1 |
| 2005/0121577 A1 * | 6/2005 | Oddsen et al. | ........... | 248/225.11 |
| 2006/0266903 A1 * | 11/2006 | Oddsen et al. | ............. | 248/274.1 |
| 2007/0040084 A1 * | 2/2007 | Sturman et al. | .......... | 248/280.11 |
| 2007/0102607 A1 * | 5/2007 | Koh | ........................... | 248/276.1 |
| 2010/0084527 A1 * | 4/2010 | Lau et al. | .................... | 248/217.4 |

\* cited by examiner

*Primary Examiner* — Bradley Duckworth
(74) *Attorney, Agent, or Firm* — Rabin & Berdo, P.C.

(57) ABSTRACT

A supporting arm assembly has an upper arm, a lower arm, a display-connecting device and a holding device. The lower arm is pivotally connected to the upper arm. The display-connecting device is mounted on the upper arm and has a pivotal pin, a connecting base, a display mount, an engaging panel and a display holding panel. The pivotal pin is mounted rotatably on the upper arm. The connecting base is connected pivotally to the pivotal pin. The display mount is mounted securely on the connecting base. The engaging panel is mounted in the display mount. The display holding panel is mounted detachably in the display mount and detachably engages the engaging panel by an engagement between at least one engaging protrusion and at least one engaging recess. The holding base is mounted on the lower arm at an end opposite to the upper arm.

18 Claims, 10 Drawing Sheets

SUPPORTING ARM ASSEMBLY FOR A DISPLAY

BACKGROUND OF THE INVENTION

1. Field of the Invention

The present invention relates to a supporting arm assembly, and more particularly to a supporting arm assembly for a display and having a capability of easily and conveniently detaching the display from the supporting arm.

2. Description of Related Art

A conventional supporting arm is connected securely to a fixing object, such as a table, a wall or a ceiling and is connected to a display to hold or hang the display onto the fixing object. However, the conventional supporting arm is connected securely with the display with fasteners, so to detach the display from the supporting arm for repair is time consuming and laborious. Additionally, to reattach the display onto the conventional supporting arm is also time consuming and laborious.

To overcome the shortcomings, the present invention tends to provide a supporting arm for a display to mitigate or obviate the aforementioned problems.

SUMMARY OF THE INVENTION

The main objective of the invention is to provide a supporting arm assembly for a display and having a capability of easily and conveniently detaching the display from the supporting arm.

The supporting arm assembly has an upper arm, a lower arm, a display-connecting device and a holding device. The upper arm has two ends. The lower arm is pivotally connected to one of the ends of the upper arm. The display-connecting device is mounted on the upper arm at an end opposite to the lower arm and has a pivotal pin, a connecting base, a display mount, an engaging panel and a display holding panel. The pivotal pin is mounted rotatably on the upper arm. The connecting base is connected pivotally to the pivotal pin. The display mount is mounted securely on the connecting base. The engaging panel is mounted in the display mount. The display holding panel is mounted detachably in the display mount and detachably engages the engaging panel by an engagement between at least one engaging protrusion and at least one engaging recess. The holding base is mounted on the lower arm at an end opposite to the upper arm.

Other objects, advantages and novel features of the invention will become more apparent from the following detailed description when taken in conjunction with the accompanying drawings.

DETAILED DESCRIPTION OF PREFERRED EMBODIMENT

Figure 1:
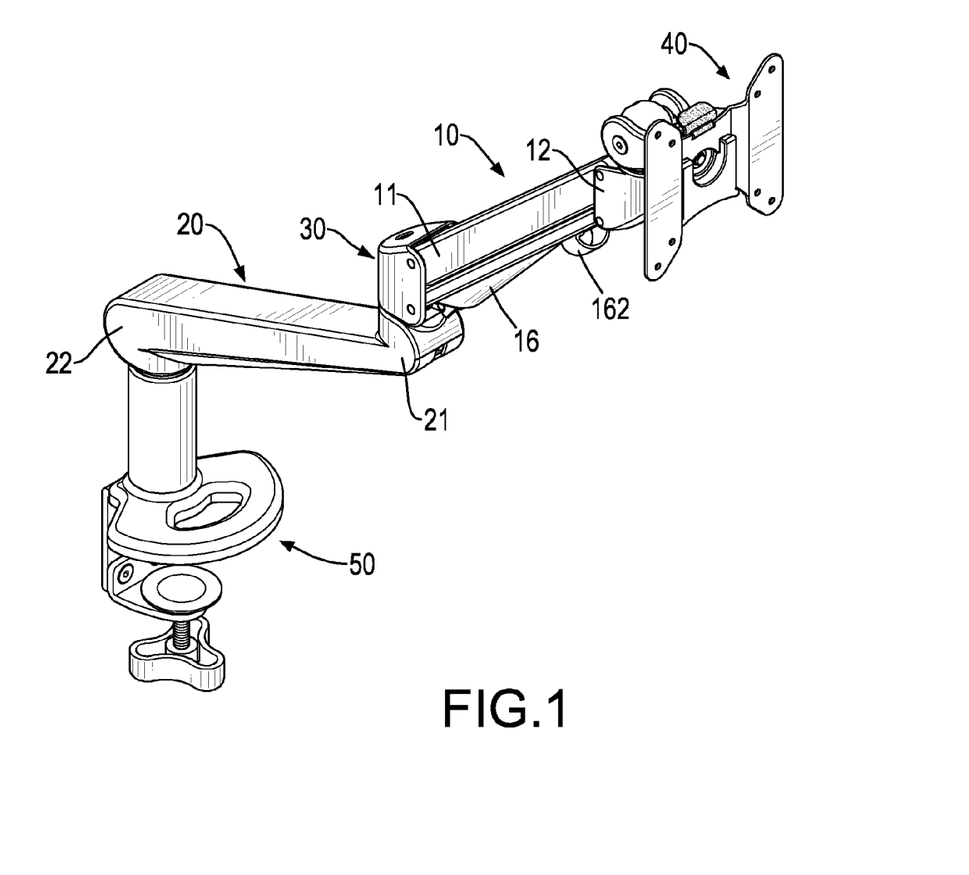
FIG. 1 is a perspective view of a supporting arm for a display in accordance with the present invention.
Figure 2:
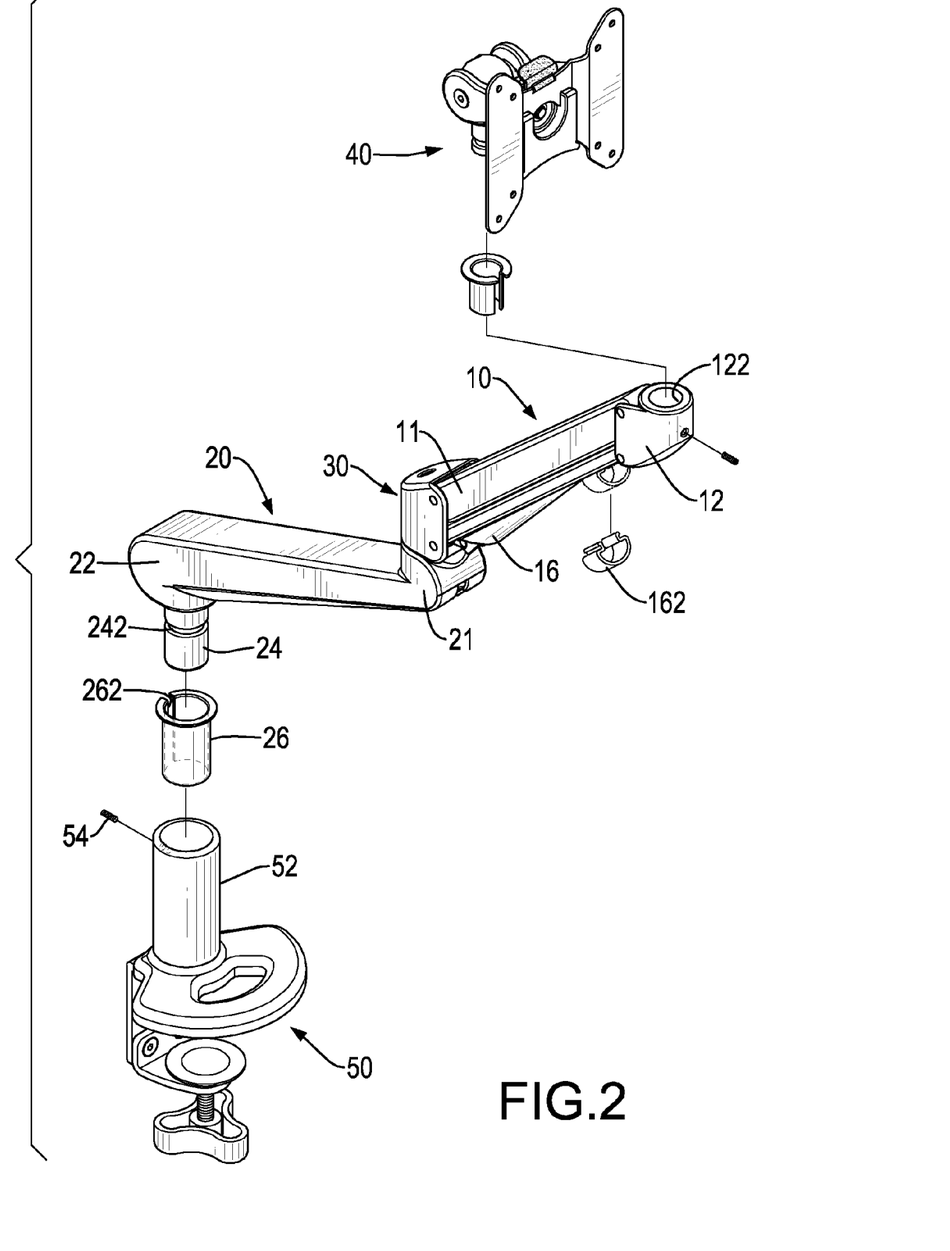
FIG. 2 is a partially exploded perspective view of the supporting arm in FIG. 1.

With reference to FIGS. 1 and 2, a supporting arm assembly for a display in accordance with the present invention comprises an upper arm 10, a lower arm 20, a display-connecting device 40 and a holding base 50. The upper and lower arms 10,20 are connected pivotally with each other, such that the relative angle/position between the arms 10,20 can be adjusted. The display-connecting device 40 is mounted on the upper arm 10 at an end opposite to the lower arm 20 and is connected with the display. The holding base 50 is mounted on the lower arm 20 at an end opposite to the upper arm 10 and is mounted securely on a fixing object, such as a table, a wall or a ceiling. Accordingly, the display can be held or hung on the fixing object by the supporting arm.

Figure 3:
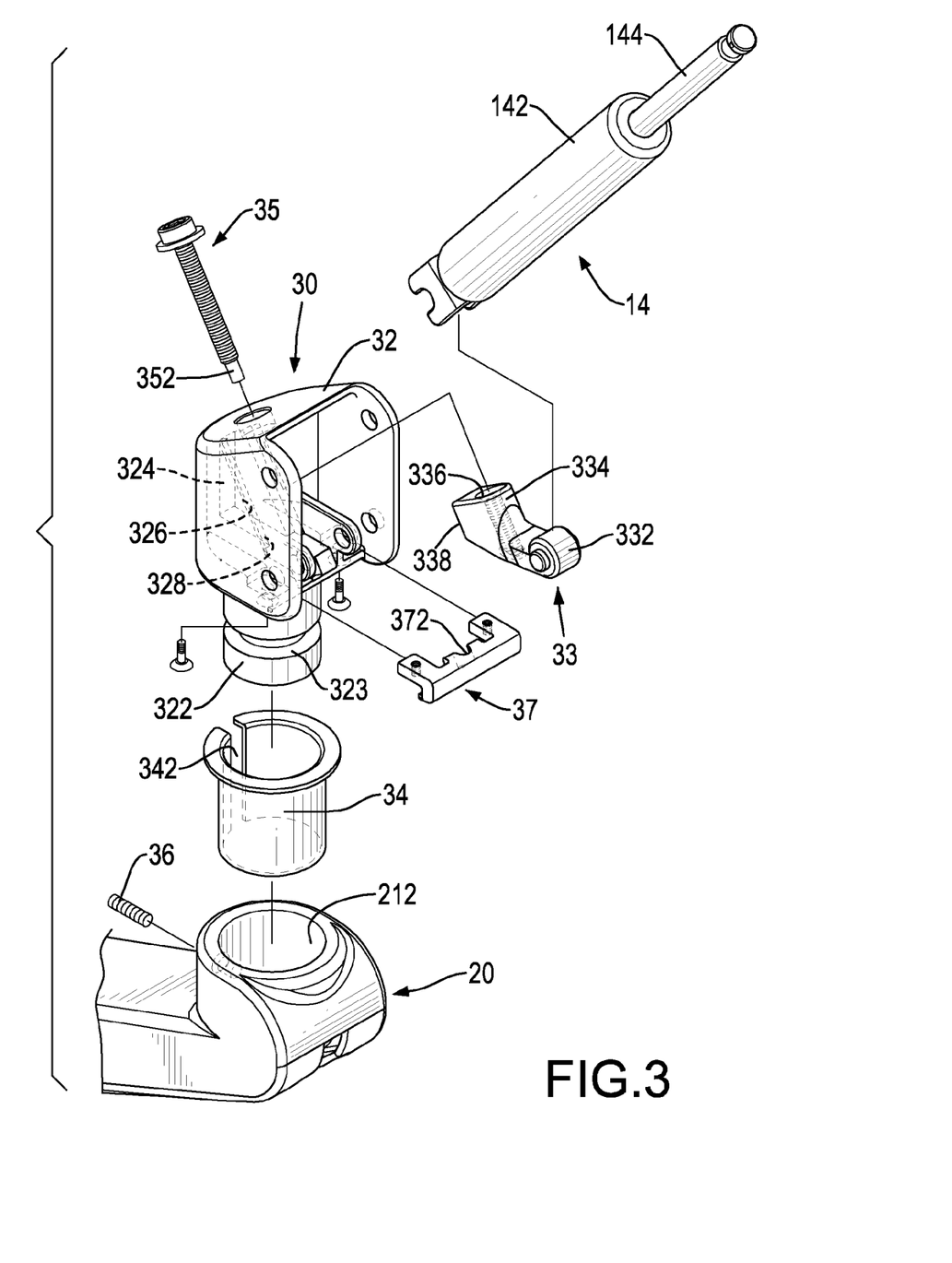
FIG. 3 is an exploded perspective view of the pivoting device between the upper and lower arms of the supporting arm in FIG. 1.
Figure 4:
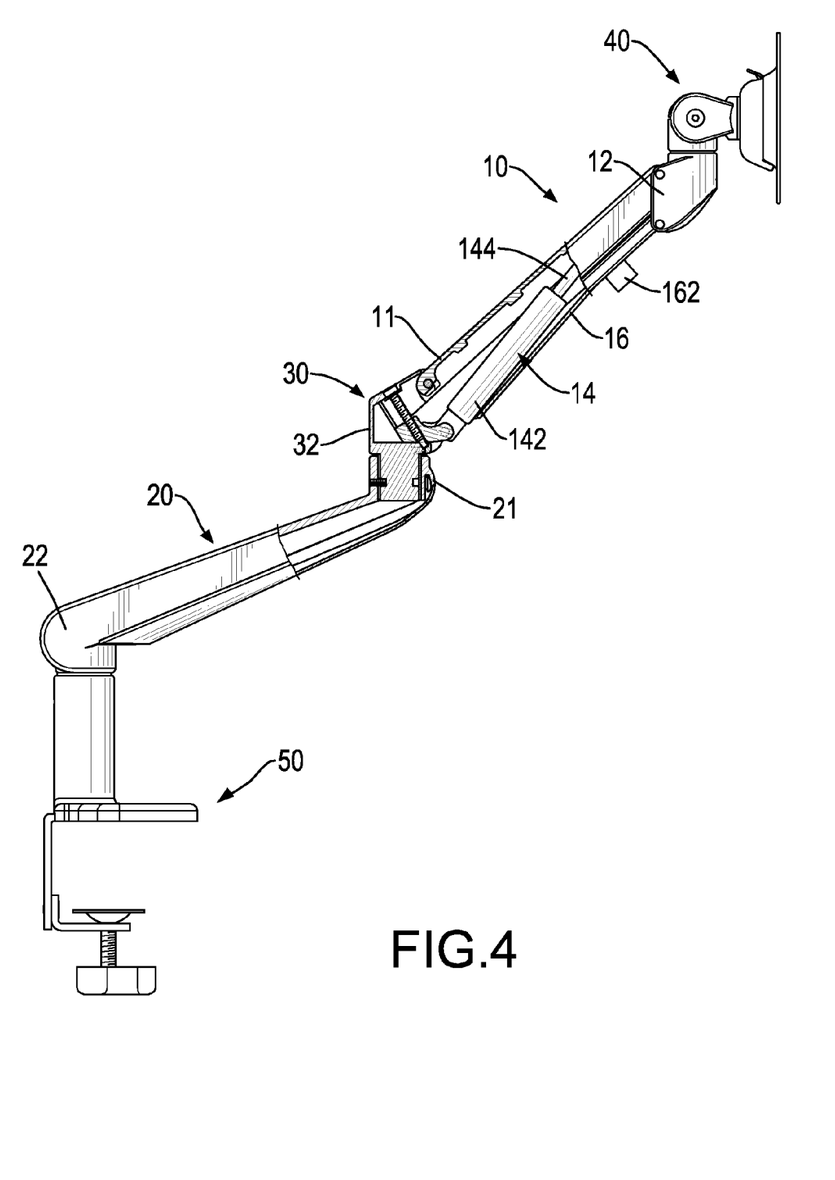
FIG. 4 is a side view in partial section of the supporting arm in FIG. 1.
Figures 5, 5A:
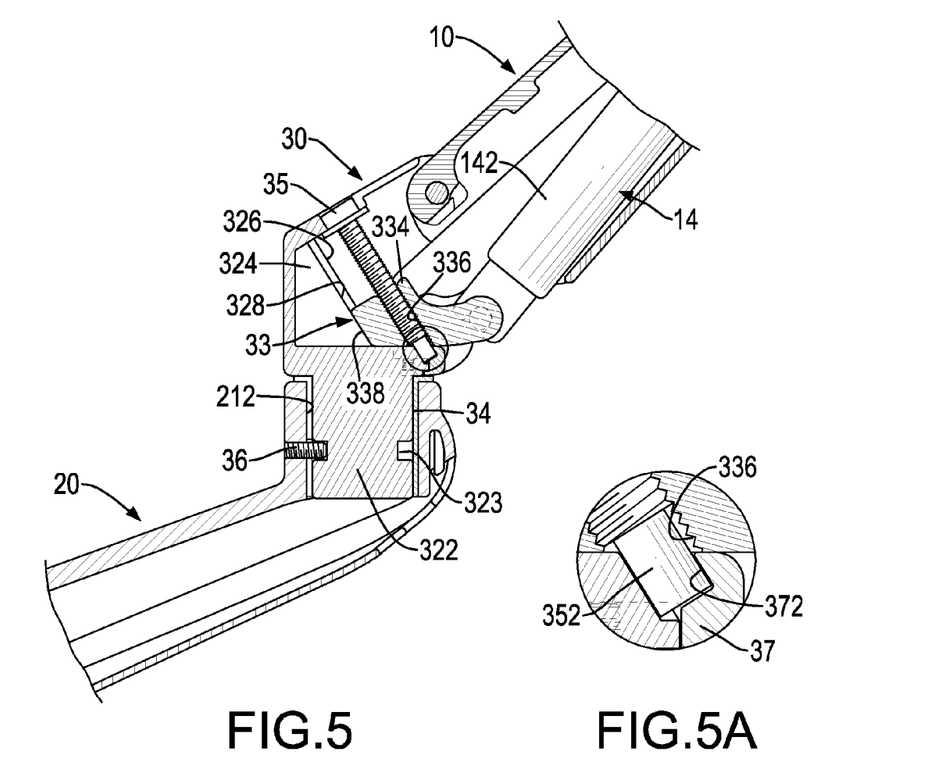
FIG. 5 is an enlarged side view in partial section of the supporting arm in FIG. 4 showing the pivoting device between the upper and lower arms.
FIG. 5A is an enlarged side view in partial section of the adjusting bolt and the stopping tab of the pivoting device in FIG. 5.

The upper arm 10 is elongated and has two ends. The end of the upper arm 10 connected to the lower arm 20 is defined as a pivotal end 11, and the end of the upper arm 10 on which the display-connecting device 40 is mounted is defined as a connecting end 12. A connecting hole 122 is defined in the connecting end 12 of the upper arm 10 for connecting with the display-connecting device 40. A pivoting device 30 is mounted on the pivotal end 11 of the upper arm 10 to pivotally connect the upper arm 10 with the lower arm 20. With further reference to FIGS. 3 to 5, the pivoting device 20 comprises a pivotal base 32, a sleeve 34 and a positioning bolt 36. The pivotal base 32 has a bottom, a chamber, an opening and a pivotal post 322. The chamber is defined in the pivotal base 32 to make the pivotal base 32 hollow and has an inner surface. The opening is defined in one side of the pivotal base 32 and communicates the chamber, and the pivotal end 11 of the upper arm 10 is inserted into the chamber via the opening and is connected securely with the pivotal base 32. The pivotal post 322 is formed on and protrudes from the bottom of the pivotal base 32 and is mounted in a pivotal hole 212 defined in the lower arm 20 at the end connected to the upper arm 10. The pivotal post 322 has an annular groove 323 defined around the pivotal post 322. The sleeve 34 is mounted around the pivotal post 322, is mounted in the pivotal hole 212 in the lower arm 20 and has a longitudinal groove 342 defined in the sleeve 34 and aligning with the annular groove 323 in the pivotal post 322. The positioning bolt 36 is screwed into the lower arm 20, is mounted through the longitudinal groove 342 in the sleeve 34 and is held slidably in the annular groove 323 in the pivotal post 322. With the positioning bolt 36 being held in the annular groove 323 in the pivotal post 322, a holding effect is provided to keep the pivotal post 322 detaching from the pivotal hole 212. Accordingly, the upper and lower arms 10, 20 can be pivoted relative to each other with the positioning bolt 36 sliding along the annular groove 323.

Additionally, the upper arm 10 may further have a cylinder 14 mounted on the upper arm 10 to support the display. The cylinder 14 may be hydraulic cylinder and has a housing 142 and a piston rod 144. The housing 142 has a first end connected pivotally to and held in the chamber of the pivotal base 32 and a second end. The first end of the housing 142 of the cylinder 14 is mounted slidably in the chamber of the pivotal base 32. The piston rod 144 is mounted in and protrudes out from the second end of the housing 142 and has an end opposite to the housing 142 and connecting pivotally to the upper arm 10 at a position near the connecting end 12 of the upper arm 10.

Figure 6:
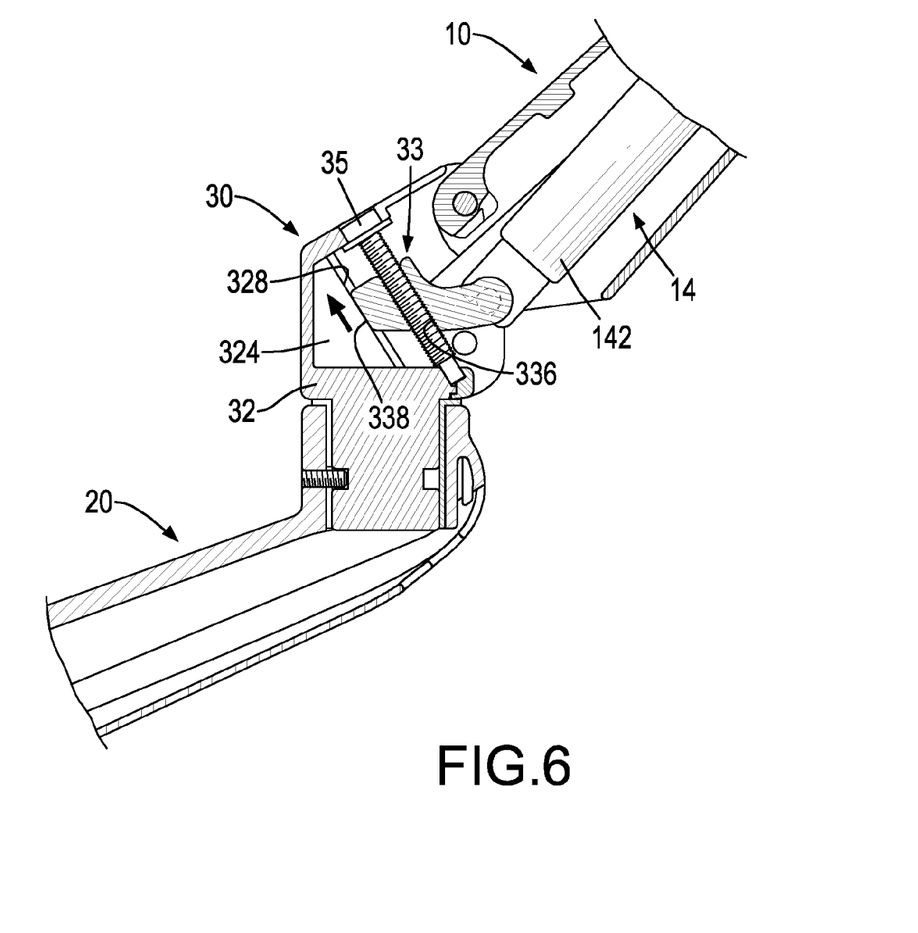
FIG. 6 is an enlarged operational side view in partial section of the supporting arm in FIG. 4.

To mount the first end of the housing 142 in the chamber of the pivotal base 32, the pivoting device 30 further comprises a slider 33, an adjusting bolt 35 and a stopping tab 37. The slider 33 is mounted slidably in the chamber of the pivotal base 32 and is pivotally connected to the first end of the housing 14. The slider 33 comprises a pivotal end 332 and an adjusting tube 334. The pivotal end 332 is connected pivotally to the first end of the housing 142 of the cylinder 14. The pivotal end 332 may be formed as a stub as shown or two pivotal ears formed separately on the pivotal end 332. The adjusting tube 334 is formed on the slider 33 at an end opposite to the pivotal end 332. The adjusting tube 334 has a threaded hole 336 defined in or may be defined through the adjusting tube 334. The adjusting bolt 35 is mounted rotatably on the pivotal base 32 in an inclined direction relative to the pivotal base 32 and is screwed into and may be mounted through the threaded hole 336 in the adjusting tube 334. When the adjusting bolt 35 is rotated, the slider 33 will be moved relative to the pivotal base 32 with the engagement between the adjusting bolt 35 and the threaded hole 336 in the adjusting tube 334. Consequently, with reference to FIG. 6, the housing 142 of the cylinder 14 can be pulled or pushed relative to the piston rod 144 as so to the pressure inside the cylinder 14 can be adjusted for supporting different displays of different sizes or scales.

To slidably mount the slider 33 in the pivotal base 32, the pivotal base 32 further has two guiding blocks 324 formed separately on the inner surface of the chamber of the pivotal base 32. Each guiding block 324 has an inclined surface 326 and may comprise a guiding channel 328 defined in the inclined surface 326 of the guiding block 324 at an edge of the inclined surface 326 facing the other guiding block 324. The slider 33 has an inclined surface 338 formed on the slider 33 at the end on which the adjusting tube 334 is formed and abutting slidably with the inclined surfaces 326 of the guiding blocks 324 in the pivotal base 32. The inclined surface 338 of the slider 33 has two edges respectively mounted slidably in the guiding channels 328 in the guiding blocks 324. Accordingly, when the adjusting bolt 35 is rotated, the slider 33 can be slid along the guiding channels 328 and the inclined surfaces 326 on the guiding blocks 324 smoothly and stably.

With further reference to FIG. 5A, the stopping tab 37 is mounted securely in the opening in the pivotal base 32 and has a stub notch 372 defined in the stopping tab 37. The adjusting bolt 35 further has a non-threaded stub 352 co-axially formed on and protruding from the adjusting bolt 35 and held rotatably in the stub notch 372 in the stopping tab 37. With the arrangement of the non-threaded stub 352 and the stub notch 372 in the stopping tab 37, the adjusting bolt 35 is mounted rotatably on the pivotal base 32.

Additionally, the upper arm 10 further has a cylinder cover 16 mounted on the upper arm 10 and holding the cylinder 14 inside. The cylinder cover 16 has a wire-holding loop 162 mounted on the cylinder cover 16, such that power wires or single cables of the display can be held in the wire-holding loop 162 to keep the wires and cables at a neat condition.

With reference to FIGS. 2 and 7 to 9, the display-connecting device 40 is connected pivotally to the connecting end 12 of the upper arm 10 and comprises a pivotal pin 42, a pivotal rod 44, a connecting base 43, a display mount 45, an engaging panel 46 and a display holding panel 48. The pivotal pin 42 is mounted rotatably on the upper arm 10 and has top end, a bottom end, a clamping hole 422, a slit 423 and a fastener. The bottom end of the pivotal pin 42 is held rotatably in the connecting hole 122 in the connecting end 12 of the upper arm 10. The clamping hole 422 is defined diametrically through the pivotal pin 42 at a position near a top end of the pivotal pin 42. The slit 423 is defined radially in the pivotal pin 42 and communicates with the clamping hole 422. The fastener mounted in the pivotal pin 42 and through the slit 423.

Figure 7:
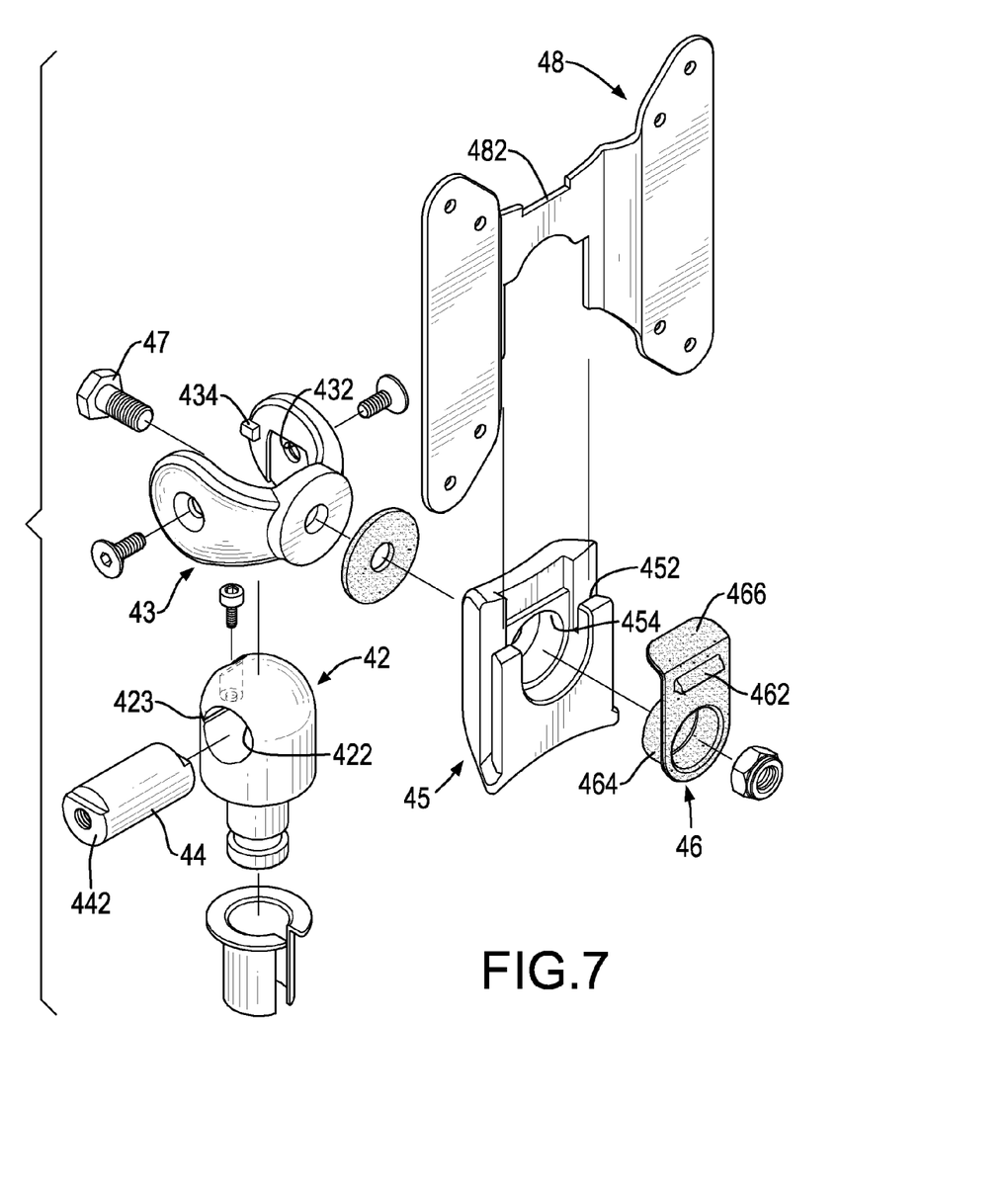
FIG. 7 is an enlarged, exploded perspective view of the display-connecting device of the supporting arm in FIG. 1.
Figure 8:
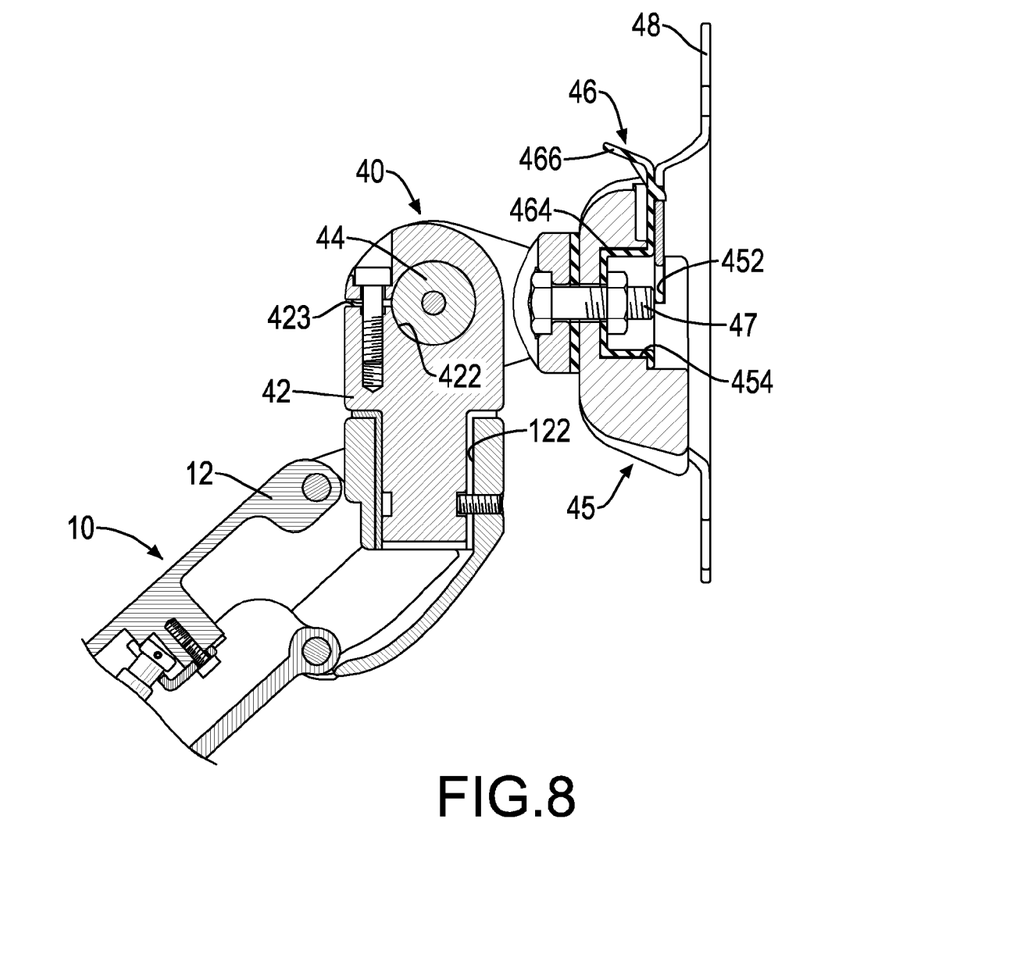
FIG. 8 is an enlarged side view in partial section of the display-connecting device in the supporting arm in FIG. 1.

The pivotal rod 44 is mounted rotatably in and clamped by the clamping hole 422 and has two ends and two holding blocks 442. The holding blocks 442 are in non-circular cross section and are formed on and protrude from the ends of the pivotal rod 44.

The connecting base 43 is connected pivotally to the pivotal pin 42 with the pivotal rod 44, may be C-shaped and mounted around the pivotal pin 42 and has two ends, two holding recesses 432 and at least one limiting block 434. Each end of the connecting base 43 has an inner side facing to each other. The holding recesses 432 are non-circular and are defined respectively in the inner sides of the ends of the connecting base 43 to hold the non-circular holding blocks 442 inside. Accordingly, the connecting base 43 is connected securely to the pivotal rod 44, and the connecting base 43 can be rotated with the pivotal rod 44 and be pivoted relative to the pivotal pin 42 after the fastener that is mounted through the slit 423 is released.

The limiting block 434 is formed on and protrudes from the inner side of one of the ends of the connecting base 43 and selectively abuts with the pivotal pin 42. With the abutment between the limiting block 434 with the pivotal pin 42, the pivotal range of the connecting base 43 relative to the pivotal pin 42 can be limited.

The display mount 45 is mounted securely on the connecting base 43 with a fastener 47 and has a panel recess 452 and a tube hole 454. The panel recess 452 is defined in the display mount 45 at a side opposite to the connecting base 43 and has a bottom surface. The tube hole 454 is defined in the bottom surface of the panel recess 452.

The engaging panel 46 is mounted in the display mount 45, may be held in the panel recess 452 in the display mount 45 and has a securing tube 464 and a finger tab 466. The securing tube 464 is formed on and protrudes from the engaging panel 46, is held in the tube hole 454 in the display mount 45 and is mounted through by the fastener 47 which is connect the display mount 45 securely with the connecting base 43. The finger tab 466 is obliquely formed on and protrudes from a top edge of the engaging panel 46.

Figure 9:
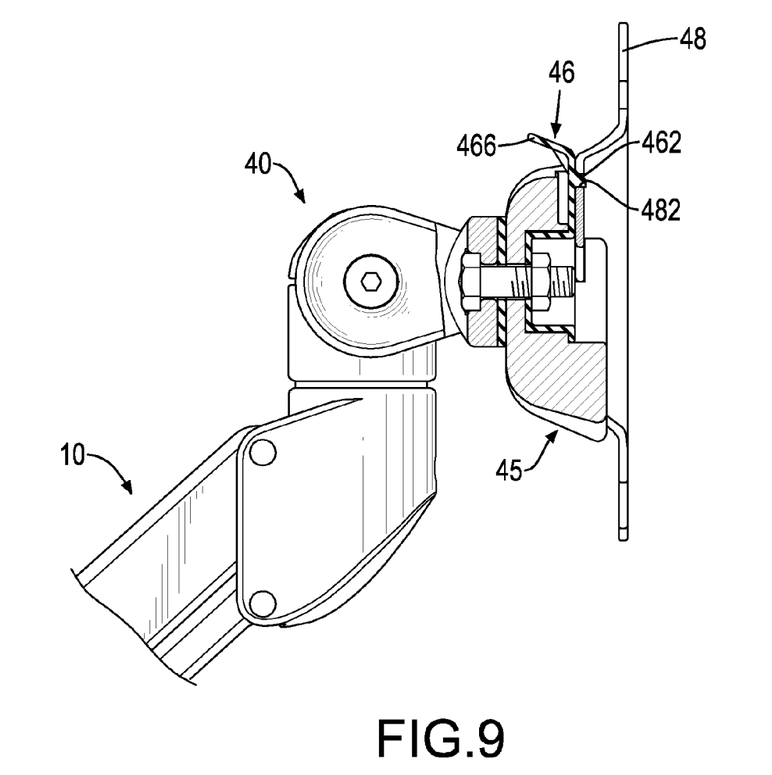
FIG. 9 is another enlarged side view in partial section of the display-connecting device of the supporting arm in FIG. 1 showing the engagement between the engaging panel and the display holding panel.

The display holding panel 48 is mounted securely with a display, is mounted detachably in the display mount 45 and detachably engages the engaging panel 46 by an engagement between at least one engaging protrusion 462 and at least one engaging recess 482. Preferably, the at least one engaging protrusion 462 is formed on the engaging panel 46, and the at least one engaging recess 482 is defined in a top edge of the display holding panel 48. Alternatively, the at least one engaging protrusion 462 is formed on the display holding panel 48, and the at least one engaging recess 482 is defined in the engaging panel 46. With the engagement between the engaging protrusion 462 and engaging recess 482, the display holding panel 48 with the display can be held securely on the display mount 45. Accordingly, the display can be connected to the supporting arm by the display-connecting device 40.

With reference to FIGS. 1, 2 and 4, the holding base 50 can be securely mounted on a fixing object and is mounted on the lower arm 20 at an end opposite to the upper arm 10. The end of the lower arm 20 on which the holding base 50 is mounted is defined as a connecting end 22, and the end of the lower arm 20 connected to the upper arm 10 is defined as a pivotal end 21. The lower arm 20 further has a pivotal post 24 and a sleeve 26. The pivotal post 24 is formed on and protrudes from the connecting end 22 of the lower arm 20 and has an annular groove 242 defined around the pivotal post 24 on the lower arm 20. The sleeve 26 is mounted around the pivotal post 24 on the lower arm 20 and has a longitudinal groove 262 defined in the sleeve 26 and aligning with the annular groove 242 in the pivotal post 24 on the lower arm 20. The holding base 50 has a pivotal tube 52 formed on the holding base 50 and holding the pivotal post 24 and the sleeve 26 the lower arm 20 inside. A positioning bolt 54 screwed into the pivotal tube 52 on the holding base 50, is mounted through the longitudinal groove 262 in the sleeve 26 and is held slidably in the annular groove 242 in the pivotal post 24 to pivotally connect the lower arm 20 with the holding base 50.

Figure 10:
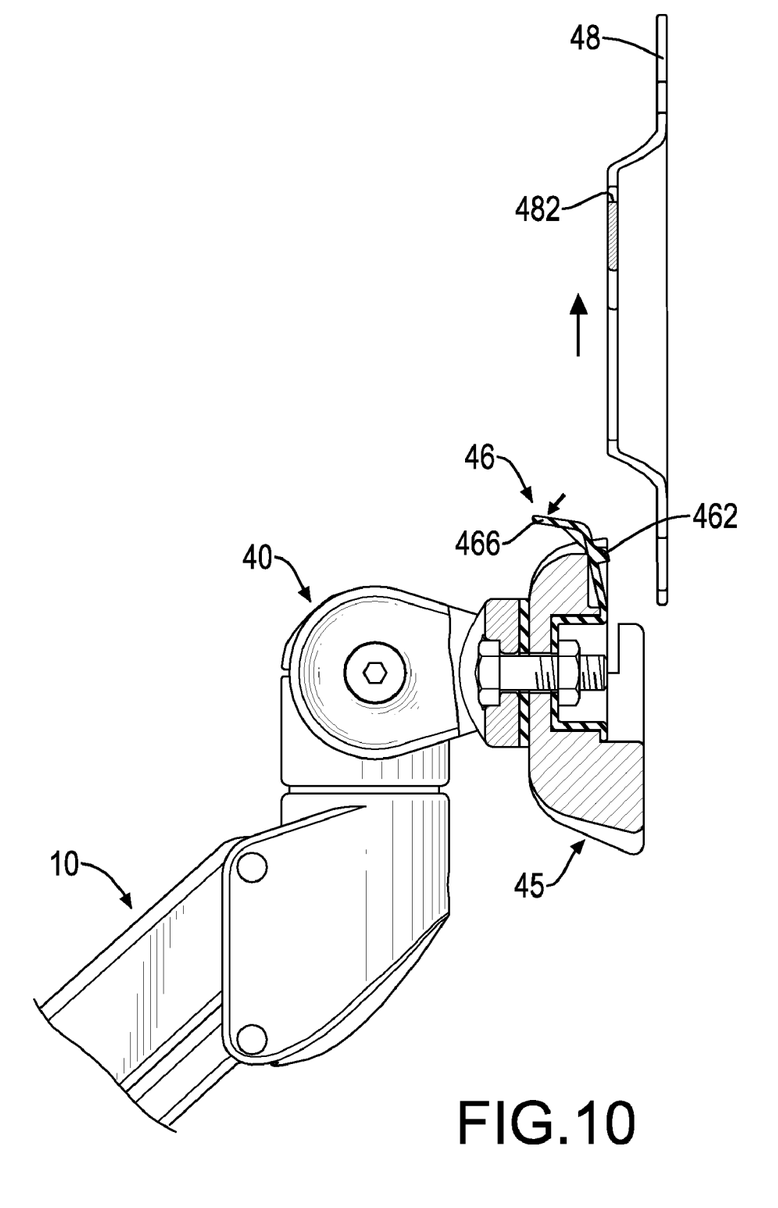
FIG. 10 is an operational side view in partial section of the display-connecting device in FIG. 9 showing the display holding panel being detached from the display mount.

With reference to FIGS. 7 and 10, to detach the display from the supporting arm, the engaging protrusion 462 is disengaged from the engaging recess 482 by pushing the finger tab 466 on the engaging panel 46. Consequently, the display holding panel 48 can be removed from the panel recess 452 in the display mount 45, such that the display can be easily detached from the supporting arm for repair or replacement. When the display holding panel 48 on which a repaired or replaced display is attached is inserted into the panel recess 452, the engaging protrusion 462 will automatically engage the engaging recess 482 to hold the display with the display holding panel 48 securely with the display mount 45. Accordingly, to detach or to reattach the display from or onto the supporting arm is easy and convenient.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A supporting arm assembly, comprising:
an upper arm having two ends;
a lower arm pivotally connected to one of the ends of the upper arm;
a display-connecting device mounted on the upper arm at an end opposite to the lower arm and having
a pivotal pin mounted rotatably on the upper arm;
a connecting base connected pivotally to the pivotal pin;
a display mount mounted securely on the connecting base;
an engaging panel mounted in the display mount; and
a display holding panel mounted detachably in the display mount and detachably engaging the engaging panel by an engagement between at least one engaging protrusion and at least one engaging recess; and
a holding base mounted on the lower arm at an end opposite to the upper arm, wherein the upper arm has a connecting hole defined in the upper arm and holding a bottom end of the pivotal pin of the display-connecting device inside;
the pivotal pin of the display-connecting device further has
a clamping hole defined diametrically through the pivotal pin at a position near a top end of the pivotal;
a slit defined radially in the pivotal pin and communicating with the clamping hole; and
a fastener mounted in the pivotal pin and through the slit; and
the display-connecting device further has a pivotal rod mounted rotatably in the clamping hole and connected securely to the connecting base to pivotally connect the connecting base with the pivotal pin.

2. The supporting arm assembly as claimed in claim 1, wherein
the upper arm is elongated;
the end of the upper arm connected to the lower arm is defined as a pivotal end;
the end of the upper arm on which the display-connecting device is mounted is defined as a connecting end; and
a pivoting device is mounted on the pivotal end of the upper arm to pivotally connect the upper arm with the lower arm.

3. The supporting arm assembly as claimed in claim 2, wherein
the lower arm has a pivotal hole defined in the lower arm at the end connected to the upper arm; and
the pivoting device comprises
a pivotal base having
a bottom;
a chamber defined in the pivotal base to make the pivotal base hollow and having an inner surface;
an opening defined in one side of the pivotal base and communicating with the chamber, wherein the pivotal end of the upper arm is inserted into the chamber via the opening and is connected securely with the pivotal base; and
a pivotal post formed on and protruding from the bottom of the pivotal base, mounted in the pivotal hole in the lower arm and having an annular groove defined around the pivotal post;
a sleeve mounted around the pivotal post, mounted in the pivotal hole in the lower arm and having a longitudinal groove defined in the sleeve and aligning with the annular groove in the pivotal post; and
a positioning bolt screwed into the lower arm, mounted through the longitudinal groove in the sleeve and held slidably in the annular groove in the pivotal post.

4. The supporting arm assembly as claimed in claim 3, wherein the upper arm further has a cylinder mounted on the upper arm and comprising
a housing having a first end connected pivotally to and held in the chamber of the pivotal base and a second end; and
a piston rod mounted in and protruding out from the second end of the housing and having an end opposite to the housing and connecting pivotally to the upper arm at a position near the connecting end of the upper arm.

5. The supporting arm assembly as claimed in claim 4, wherein
the first end of the housing of the cylinder is mounted slidably in the chamber of the pivotal base; and
the pivoting device further comprises
a slider mounted slidably in the chamber of the pivotal base, pivotally connected to the first end of the housing and having a pivotal end connected pivotally to the first end of the housing of the cylinder; and an adjusting tube formed on the slider at an end opposite to the pivotal end and having a threaded hole defined in the adjusting tube; and an adjusting bolt mounted rotatably on the pivotal base and screwed into the threaded hole in the adjusting tube.

6. The supporting arm assembly as claimed in claim 5, wherein the pivotal base further has two guiding blocks formed separately on the inner surface of the chamber of the pivotal base, and each guiding block has an inclined surface; and the slider further has an inclined surface formed on the slider at the end on which the adjusting tube is formed and abutting slidably with the inclined surfaces of the guiding blocks in the pivotal base.

7. The supporting arm assembly as claimed in claim 6, wherein each guiding block in the pivotal base further has a guiding channel defined in the inclined surface of the guiding block at an edge of the inclined surface facing the other guiding block; and the inclined surface of the slider has two edges respectively mounted slidably in the guiding channels in the guiding blocks.

8. The supporting arm assembly as claimed in claim 7, wherein the threaded hole in the adjusting tube of the slider is defined through the adjusting tube;

the pivotal base further has a stopping tab mounted securely in the opening in the pivotal base and having a stub notch defined in the stopping tab;

the adjusting bolt is mounted through the threaded hole in the adjusting tube and has a non-threaded stub co-axially formed on and protruding from the adjusting bolt and held rotatably in the stub notch in the stopping tab.

9. The supporting arm assembly as claimed in claim 8, wherein the connecting base is C-shaped, is mounted around the pivotal pin and has two ends each having an inner side facing to each other; and two non-circular holding recesses defined respectively in the inner sides of the ends of the connecting base; and the pivotal rod has two ends and two holding blocks in non-circular cross section held respectively in the holding recesses in the connecting base.

10. The supporting arm assembly as claimed in claim 9, wherein the display mount of the display-connecting device has a panel recess defined in the display mount at a side opposite to the connecting base and having a bottom surface; and a tube hole defined in the bottom surface of the panel recess;

the engaging panel is held in the panel recess in the display mount and has a securing tube formed on and protruding from the engaging panel and held in the tube hole in the display mount; and a finger tab obliquely formed on and protruding from a top edge of the engaging panel.

11. The supporting arm assembly as claimed in claim 10, wherein the connecting base of the display-connecting device further has a limiting block formed on and protruding from the inner side of one of the ends of the connecting base and selectively abutting with the pivotal pin.

12. The supporting arm assembly as claimed in claim 11, wherein the end of the lower arm on which the holding base is mounted is defined as a connecting end;

the lower arm further has a pivotal post formed on and protruding from the connecting end of the lower arm and having an annular groove defined around the pivotal post on the lower arm; and a sleeve mounted around the pivotal post on the lower arm and having a longitudinal groove defined in the sleeve and aligning with the annular groove in the pivotal post on the lower arm;

the holding base has a pivotal tube formed on the holding base and holding the pivotal post and the sleeve on the lower arm inside; and a positioning bolt is screwed into the pivotal tube on the holding base, is mounted through the longitudinal groove in the sleeve on the lower arm and is held slidably in the annular groove in the pivotal post on the lower arm.

13. The supporting arm assembly as claimed in claim 12, wherein the upper arm further has a cylinder cover mounted on the upper arm and holding the cylinder inside; and the cylinder cover has a wire-holding loop mounted on the cylinder cover.

14. The supporting arm assembly as claimed in claim 1, wherein the upper arm further has a cylinder mounted on the upper arm and comprising a housing having a first end connected pivotally to and held in the chamber of the pivotal base and a second end; and a piston rod mounted in and protruding out from the second end of the housing and having an end opposite to the housing and connecting pivotally to the upper arm at a position near the connecting end of the upper arm.

15. The supporting arm assembly as claimed in claim 14, wherein the first end of the housing of the cylinder is mounted slidably in the chamber of the pivotal base; and the pivoting device further comprises a slider mounted slidably in the chamber of the pivotal base, pivotally connected to the first end of the housing and having a pivotal end connected pivotally to the first end of the housing of the cylinder; and an adjusting tube formed on the slider at an end opposite to the pivotal end and having a threaded hole defined in the adjusting tube; and an adjusting bolt mounted rotatably on the pivotal base and screwed into the threaded hole in the adjusting tube.

16. The supporting arm assembly as claimed in claim 15, wherein the pivotal base further has two guiding blocks formed separately on the inner surface of the chamber of the pivotal base, and each guiding block has an inclined surface;

each guiding block in the pivotal base further has a guiding channel defined in the inclined surface of the guiding block at an edge of the inclined surface facing the other guiding block;

the slider further has an inclined surface formed on the slider at the end on which the adjusting tube is formed and abutting slidably with the inclined surfaces of the guiding blocks in the pivotal base; and the inclined surface of the slider has two edges respectively mounted slidably in the guiding channels in the guiding blocks.

17. The supporting arm assembly as claimed in claim 1, wherein
the connecting base is C-shaped, is mounted around the pivotal pin and has
two ends each having an inner side facing to each other; and
two non-circular holding recesses defined respectively in the inner sides of the ends of the connecting base; and
the pivotal rod has two ends and two holding blocks in non-circular cross section held respectively in the holding recesses in the connecting base.

18. The supporting arm assembly as claimed in claim 17, wherein
the display mount of the display-connecting device has
a panel recess defined in the display mount at a side opposite to the connecting base and having a bottom surface; and
a tube hole defined in the bottom surface of the panel recess;
the engaging panel is held in the panel recess in the display mount and has
a securing tube formed on and protruding from the engaging panel and held in the tube hole in the display mount; and
a finger tab obliquely formed on and protruding from a top edge of the engaging panel.

\* \* \* \* \*